United States Patent
Bazan

[19]

[11] Patent Number: 5,980,963
[45] Date of Patent: Nov. 9, 1999

[54] METHOD AND APPARATUS FOR PUMPING MARINATED PRODUCTS

[75] Inventor: Alberto Bazan, 4347 Ridgegate Dr., Duluth, Ga. 30155

[73] Assignee: Alberto Bazan, Duluth, Ga.

[21] Appl. No.: 08/781,628

[22] Filed: Jan. 10, 1997

[51] Int. Cl.[6] .................... A22C 5/00; A23B 4/00
[52] U.S. Cl. .............. 426/281; 99/535; 417/413.1; 426/519; 426/641
[58] Field of Search .................... 426/281, 519, 426/392, 418, 641, 644, 652, 805; 99/535; 417/413.1; 53/111 R; 452/141; 141/67; 222/55, 61; 137/571

[56] References Cited

U.S. PATENT DOCUMENTS

| | | | |
|---|---|---|---|
| 550,151 | 11/1895 | Averkamp | 99/535 |
| 3,928,634 | 12/1975 | Gasbarro | 426/281 |
| 3,955,486 | 5/1976 | Strommer | 426/508 |
| 4,214,518 | 7/1980 | Petsche | 99/535 |
| 4,520,718 | 6/1985 | Prosenbauer | 99/535 |
| 4,940,590 | 7/1990 | Williams et al. | 426/641 |
| 4,974,754 | 12/1990 | Wirz | 222/207 |
| 5,057,332 | 10/1991 | Davidson et al. | 426/281 |
| 5,083,507 | 1/1992 | Van Haren | 99/472 |
| 5,084,286 | 1/1992 | Moody | 426/281 |
| 5,200,223 | 4/1993 | Simonsen | 426/281 |
| 5,213,029 | 5/1993 | Yutaka | 99/474 |
| 5,429,831 | 7/1995 | Williams et al. | 426/641 |

*Primary Examiner*—George C. Yeung
*Attorney, Agent, or Firm*—Rogers & Killeen

[57] ABSTRACT

Storing and transporting meat products after marinating and before packaging causes a loss of marinade from the meat product. This loss of marinade is reduced by surrounding the marinated meat product in excess marinade during storage and by containing the marinated meat product in an enclosed conduit, surrounded by excess marinade, and pressurizing the marinade during transportation of the marinated meat product.

20 Claims, 2 Drawing Sheets

METHOD AND APPARATUS FOR PUMPING MARINATED PRODUCTS

BACKGROUND OF THE INVENTION

The present invention relates to a method and apparatus for storing and transporting marinated meat products after marinating and before packaging.

Producers of marinated meat products typically marinate their meat products at one site in a factory and package their marinated meat product at another site. The marinated meat product must be transported from the marinating site to the packaging site. This transportation causes a loss of marinade from the meat product. In some situations, the marinated meat product must be temporarily stored between the marinating site and the packaging site. This storage also causes a loss of marinade.

The loss of marinade during storage and transportation of a marinated meat product is caused by the internal pressure of the muscle tone of the meat product. Additionally, the weight of other meat products piled on top of the meat product during storage and the vibrational force on the meat product during transportation causes the loss of marinade. All of these factors tend to force the marinade out of the meat product especially when the marinated meat product is stored in a dry storage container and/or where the marinated meat product must be transported a large distance by a mechanical conveyor belt.

The loss of marinade from a marinated meat product is significant in two ways: first, a loss of marinade will reduce the spiciness and juiciness of the meat product; and second, the waste of marinade will increase the cost of the meat product. Both the reduction of quality and the increase in price will ultimately reduce the satisfaction of the consumer with the meat product.

Accordingly, it is an object of the present invention to provide a novel method and apparatus which overcomes many of the known problems associated with the storage and transportation of marinated meat products.

It is another object of the present invention to provide a novel method and apparatus which reduces the loss of marinade from a marinated meat product during storage and transportation.

It is another object of the present invention to provide a novel method and apparatus which reduces the loss of marinade from a marinated meat product during storage and transportation by overcoming the internal pressure of the muscle tone of the meat product.

It is yet another object of the present invention to provide a novel method and apparatus which reduces the loss of marinade from a marinated meat product during storage.

It is still another object of the present invention to provide a novel method and apparatus which reduces the loss of marinade from a marinated meat product during transportation.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

The present invention may be used in a meat factory for storing and transporting marinated meat products.

Figure 1:
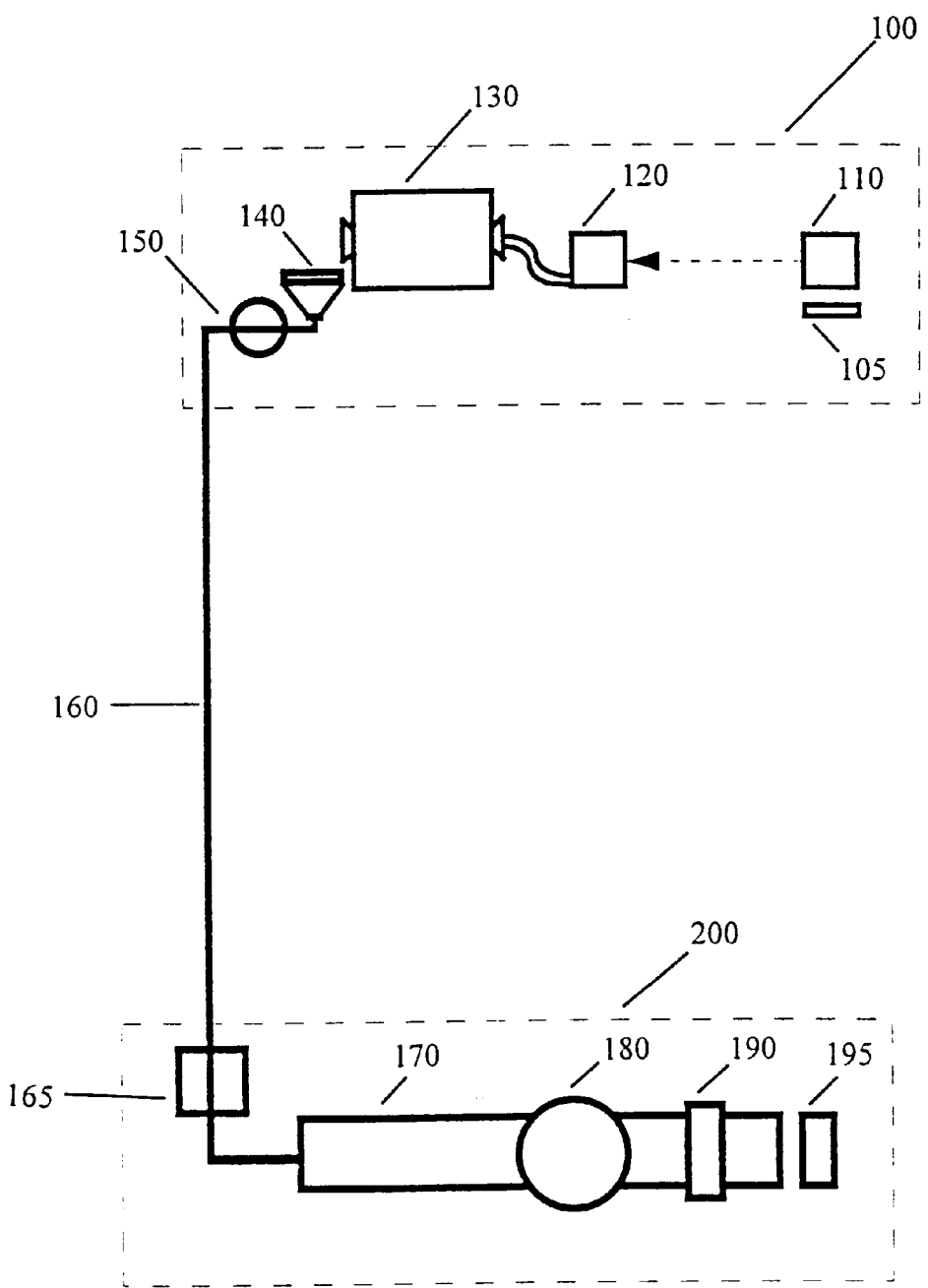
FIG. 1 is a schematic drawing of one embodiment of the system of the present invention showing the marinating and packaging sites.

As shown in FIG. 1, a meat product may be transported in a meat factory to a remote marinating site 100 in a conventional tote 110 suitable for containing the meat product. The tote and the meat product are placed on a conventional "in" scale 105 suitable for weighing the tote and the meat product. The meat product is placed into a conventional vacuum hopper 120 suitable for temporarily storing the meat product. Then, the meat product is transferred into a conventional marination tumbler 130 suitable for marinating the meat product.

After marination, the marinated meat product and excess marinade are placed into a conventional storage vessel or hopper 140 suitable for temporarily storing the marinated meat products. The amount of excess marinade may vary with the meat and with the length of the transportation, but preferably the amount of excess marinade is about ½% to 1% of the total volume of the marinated meat. The marinated meat product and the excess marinade are pumped by a conventional diaphragm pump 150 suitable for pumping the marinated meat product and excess marinade from the hopper 140 at the marinating site 100, through the enclosed conduit 160, and to the processor 170 at the packaging site 200. The pressure to pump the marinated meat product and excess marinade in the conduit may be between about 15 psi to 80 psi, but preferably the pressure is about 20 psi.

The processor 170 desirably consists of either: (a) a conventional layout conveyor suitable for separating the marinated meat product from the excess marinade; or (b) a conventional breader suitable for breading the marinated meat product, a conventional layout conveyor suitable for separating the breaded meat product from excess marinade and breading, and a conventional fryer suitable for frying the breaded meat product prior to packaging.

After processing, the marinated meat product (without excess marinade or breading) may be transported to a conventional freezer 180 suitable for freezing the meat product. Finally, the frozen marinated meat product is transported to a conventional packager 190 suitable for packaging the meat product, and the meat product is placed on a conventional "out" scale 195 suitable for weighing the meat product.

The difference between the "in" measurement and the "out" measurement is the net yield of the marinating, transporting and freezing processes.

With the present invention, the marinated meat product may be transported from the hopper to the packaging site or may be temporarily stored in the hopper, both without significant loss of marinade from the marinated meat product.

Figure 2:
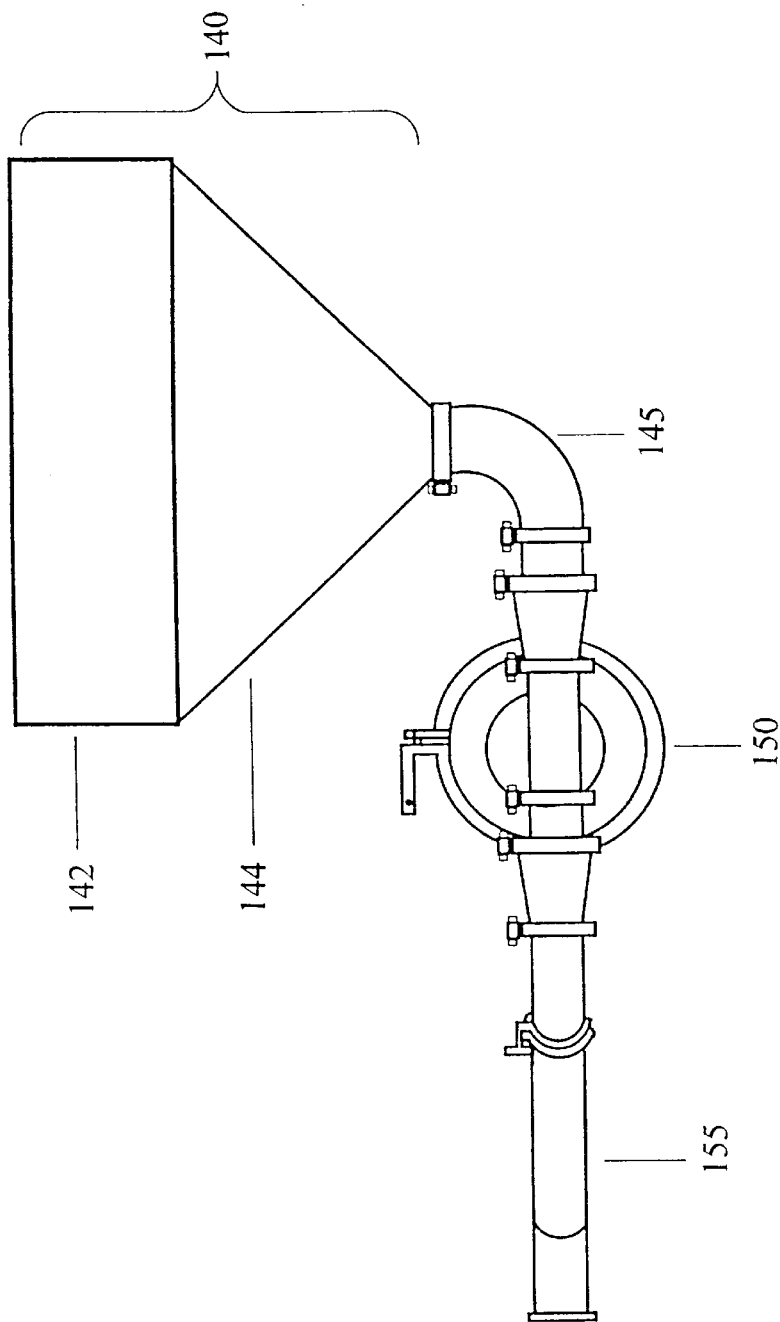
FIG. 2 is an elevation of one embodiment of certain of the components of the system of FIG. 1 showing the hopper, conduits and diaphragm pump.

As shown in FIG. 2, the marinaded meat products may be temporarily stored after marination in the hopper, e.g., the marinated meat products and excess marinade may be introduced through the cylindrical upper portion 142 to the conical lower portion 144 of the storage vessel 140. Both the cylindrical upper portion 142 and the conical lower portion 144 of the storage vessel are desirably made from conventional stainless steel suitable for storing marinated meat products.

To transport the marinated meat products, the diaphragm pump 150 is activated, also shown in FIG. 2. The diaphragm pump 150 supplies a suction which draws the products from the lower portion 144 of the storage vessel 140, through the first conduit 145, and into the diaphragm pump 150. The diaphragm pump 150 also supplies a pressure which pushes the products out of the diaphragm pump 150, through the second conduit 155, and to a final destination. The first conduit 145 and second conduit 155 are desirably made from conventional stainless steel suitable for containing marinated meat products and are connected to the lower portion 144 of the storage vessel 140 and to the diaphragm pump 150 by conventional tri-clamps suitable for providing sanitary connections. The second conduit may further include a reducer (165) for increasing the internal pressure of the second conduit.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of reducing the loss of marinade from a marinated meat product during the transportation of the marinated meat product from a remote marinating site to a packaging site, comprising the steps of:
   (a) providing an enclosed conduit connecting a remote marinating site and a packaging site;
   (b) receiving a marinated meat product and excess marinade as a mixture into the conduit at the remote marinating site;
   (c) pumping the mixture through the conduit from the remote marinating site to the packaging site; and
   (d) separating the marinated meat product from the excess marinade at the packaging site; and
   (e) packaging the marinated meat product at the packaging site promptly after separating the marinated meat product from the excess marinade;

whereby the marinated meat product is contained in the enclosed conduit and substantially surrounded by excess marinade during transportation thereby reducing the loss of marinade from the marinated meat product.

2. The method of claim 1 including the further step of maintaining a positive pressure within the conduit tending to move the excess marinade into the marinated meat product.

3. The method of claim 2 wherein the pressure within the conduit is not less than about 15 psi and the excess marinade is about ½% to 1% of the total volume of the marinated meat product.

4. A method of reducing the loss of marinade from a marinated meat product prior to packaging comprising the steps of:
   (a) providing a tumbler for tumbling a meat product in sufficient liquid marinade under a vacuum to marinade the meat product and leave excess marinade;
   (b) moving the marinated meat product and excess marinade as a mixture into a storage vessel;
   (c) providing an enclosed conduit;
   (d) providing means for separating the marinated meat product from the excess marinade and for packaging the marinated meat product; and
   (e) pumping the mixture of marinated meat product and excess marinade from storage vessel through the enclosed conduit to the packaging means.

5. The method of claim 4 including the further step of maintaining a positive pressure within the enclosed conduit tending to move the excess marinade into the marinated meat product.

6. The method of claim 5 wherein the pressure within the conduit is not less than about 15 psi and the excess marinade is about ½% to 1% of the total volume of the marinated meat product.

7. A transfer unit for transporting marinated meat products from a marinating vessel to a packager comprising:
   (a) a hopper having a generally cylindrical upper portion for receiving marinated meat products and excess marinade and a conical lower portion;
   (b) a diaphragm pump;
   (c) a first conduit internally communicating between the bottom of said hopper and the intake of said pump through sanitary connections; and
   (d) a second conduit internally communicating with the discharge of said pump for operative connection with a packager through sanitary connections.

8. The transfer unit of claim 7 wherein said hopper, said first and second conduits and said pump are made of stainless steel.

9. The transfer unit of claim 7, wherein said second conduit includes a reducer for increasing the pressure internal of said second conduit.

10. Apparatus for reducing the loss of marinade from a marinated meat product prior to packaging comprising:
    (a) a tumbler for tumbling a meat product in sufficient liquid marinade under a vacuum to marinade the meat product and leave excess marinade;
    (b) a storage vessel;
    (c) means for moving the marinated meat product and excess marinade from said tumbler as a mixture into said storage vessel;
    (d) an enclosed conduit;
    (e) means for separating the marinated meat product from the excess marinade and for packaging the marinated meat product; and
    (f) a pump for pumping the mixture of marinated meat product and excess marinade from said storage vessel through said enclosed conduit to said packaging means.

11. The apparatus of claim 10 including means for maintaining a positive pressure within said enclosed conduit tending to move the excess marinade into the marinated meat product.

12. The apparatus of claim 11 wherein the means for maintaining a positive pressure maintains the pressure within the conduit not less than about 15 psi.

13. The apparatus of claim 10 including means associated with said conduit for increasing the pressure within the conduit.

14. An apparatus for reducing the loss of marinade from a marinated meat product during the transportation of the marinated meat product from a remote marinating site to a packaging site, comprising:
    (a) an enclosed conduit connecting a remote marinating site and a packaging site;
    (b) means for receiving a marinated meat product and excess marinade as a mixture into the conduit at the remote marinating site;
    (c) means for pumping the mixture through the conduit from the remote marinating site to the packaging site; and
    (d) means for separating the marinated meat product from the excess marinade at the packaging site; and
    (e) means for packaging the marinated meat product at the packaging site promptly after separating the marinated meat product from the excess marinade;

whereby the marinated meat product is contained in the enclosed conduit and substantially surrounded by excess marinade during transportation thereby reducing the loss of marinade from the marinated meat product.

15. The apparatus of claim 14 wherein said pump means is a diaphragm pump, and wherein said means for receiving a marinated meat product and excess marinade into the conduit comprises:

(a) a hopper having a generally cylindrical upper portion for receiving marinated meat products and excess marinade and a conical lower portion;

(b) a suction conduit internally communicating between the bottom of said hopper and the intake of said pump through sanitary connections; and (c) a discharge conduit internally communicating with the discharge of said pump for operative connection with said enclosed conduit through sanitary connections.

16. The apparatus of claim 15, wherein said discharge conduit includes a reducer for increasing the pressure internal of said discharge conduit.

17. The apparatus of claim 14 including means for maintaining a positive pressure within said conduit tending to move the excess marinade into the marinated meat product.

18. The apparatus of claim 17 including means for maintaining the pressure within the conduit not less than about 15 psi and the excess marinade is about ½% to 1% of the total volume of the marinated meat product.

19. A method for reducing the loss of marinade from a marinated meat product during the transportation of the marinated meat product from a remote marinating site to a packaging site comprising:

(a) providing an enclosed conduit connecting a remote marinating site and a packaging site;

(b) moving the marinated meat product and excess marinade from the marinating site through said conduit to the packaging site;

(c) maintaining the pressure in said conduit not less than about 15 psi.

20. An apparatus for reducing the loss of marinade from a marinated meat product during the transportation of the marinated meat product from a remote marinating site to a packaging site, comprising:

(a) an enclosed conduit connecting a remote marinating site and a packaging site; and (b) means for moving the marinated meat product and excess marinade under pressure through said conduit from said marinating site to said packaging site wherein said moving means maintains the internal pressure of said conduit not less than about 15 psi.

* * * * *